United States Patent
Picard et al.

(10) Patent No.: US 9,472,312 B2
(45) Date of Patent: Oct. 18, 2016

(54) METHOD FOR PRECIPITATING ONE OR MORE SOLUTES

(75) Inventors: Romain Picard, Bagnols sur Ceze (FR); Jean Duhamet, Bagnols sur Ceze (FR); Denis Ode, Bagnols sur Ceze (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 399 days.

(21) Appl. No.: 14/000,253

(22) PCT Filed: Feb. 24, 2012

(86) PCT No.: PCT/EP2012/053134
§ 371 (c)(1),
(2), (4) Date: Oct. 3, 2013

(87) PCT Pub. No.: WO2012/116930
PCT Pub. Date: Sep. 7, 2012

(65) Prior Publication Data
US 2014/0044616 A1   Feb. 13, 2014

(30) Foreign Application Priority Data
Feb. 28, 2011   (FR) ...................... 11 51610

(51) Int. Cl.
G21C 19/46   (2006.01)
G21F 9/04   (2006.01)
G21F 9/10   (2006.01)

(52) U.S. Cl.
CPC ............. G21C 19/46 (2013.01); G21F 9/04 (2013.01); G21F 9/10 (2013.01); Y02W 30/883 (2015.05)

(58) Field of Classification Search
None
See application file for complete search history.

(56) References Cited

U.S. PATENT DOCUMENTS

| | | | |
|---|---|---|---|
| 3,395,988 A | 8/1968 | Auchapt et al. | |
| 4,464,341 A | 8/1984 | Auchapt et al. | |
| 4,548,790 A | 10/1985 | Horwitz et al. | |
| 2009/0294299 A1 | 12/2009 | Mizuguchi et al. | |
| 2010/0196229 A1 | 8/2010 | Borda et al. | |
| 2010/0301287 A1 | 12/2010 | Johnson et al. | |

FOREIGN PATENT DOCUMENTS

| | | | |
|---|---|---|---|
| FR | 2905283 A1 | 3/2008 | |
| WO | WO2008025823 A1 * | 3/2008 | |
| WO | 2008105928 A2 | 9/2008 | |

* cited by examiner

*Primary Examiner* — Melissa Swain
(74) *Attorney, Agent, or Firm* — Hultquist, PLLC; Mary B. Grant

(57) ABSTRACT

The invention deals with a method for precipitating at least one solute in a reactor comprising:
a) a step in which a first liquid phase comprising the solute and a second liquid phase comprising a solute precipitation reagent are brought into contact in co-current in a reactor, as a result of which an emulsion mix is obtained comprising precipitate particles in suspension, and a third liquid phase forming a dispersing phase for said emulsion mix; and
b) a step in which the mix mentioned in step a) is fluidized by the third phase.

19 Claims, 2 Drawing Sheets

METHOD FOR PRECIPITATING ONE OR MORE SOLUTES

CROSS-REFERENCE TO RELATED APPLICATIONS

This application is a U.S. national phase under the provisions of 35 U.S.C. §371 of International Patent Application No. PCT/EP12/53134 filed Feb. 24, 2012, which in turn claims priority of French Patent Application No. 1151610 filed Feb. 28, 2011. The disclosures of such international patent application and French priority patent application are hereby incorporated herein by reference in their respective entireties, for all purposes.

TECHNICAL FIELD

This invention relates to a method for precipitating one or more solutes contained in a liquid phase.

It has applications in the treatment and recycling of spent nuclear fuel, for which it is particularly advantageous for oxalic preparation of actinides that can occur after a nuclear fuel treatment process, particularly in order to retrieve uranium and plutonium currently present in spent fuels.

More precisely, the spent nuclear fuel treatment process may comprise several cycles and particularly three purification cycles after the conventional steps to remove the cladding and dissolution in concentrated nitric acid, namely:
  a first cycle aimed at jointly decontaminating uranium and plutonium of two actinides(III), americium and curium, and the majority of fission products, and creating a partition of uranium and plutonium into two flows; and
  two complementary cycles called the "second uranium cycle" and "second plutonium cycle" respectively, aimed at purifying uranium and plutonium separately after their partition.

The plutonium thus isolated is then subjected to an oxalic precipitation step to give a precipitate of plutonium oxalate $Pu(C_2O_4)_2$, and this precipitate can then be transformed into plutonium oxide.

One of the difficulties of precipitation methods and particularly the oxalic precipitation method lies in the sticky nature of the precipitate, part of which can stick to the walls of the reactor in which the precipitation reaction takes place.

Precipitation methods according to prior art can be used in many types of reactors.

Simple design reactors may include crystalliser type reactors and vortex type reactors.

Crystalliser type reactors are based on the principle of a progressive increase in supersaturation of the precipitation solution leading to a crystallisation of the solute to be precipitated, this type of reactor conventionally operating in discontinuous mode which limits their use in the context of making a precipitation at industrial scale. One solution to overcome this disadvantage is to increase the number of reactors and have them function in parallel and at different times.

Vortex type reactors, like those defined for example in U.S. Pat. No. 3,395,988 and U.S. Pat. No. 4,464,341, are conventionally composed of a glass receptacle, the content of which is stirred by rotation of a rod inside it that creates a vortex with two functions, namely to keep the precipitate in an aqueous phase and away from the glass walls and to guarantee sufficient residence time for the growth of precipitate grains to make them less sticky. However, these reactors periodically get clogged and it is difficult to guarantee sub-critical conditions when the sizes of these reactors have to be increased.

Reactors with a more complex design have also been envisaged, including so-called "pulsed column" reactors as disclosed in FR 2905283 that use a pulsed counter-current system and confinement of the precipitate by an organic phase in an internally lined column, however with the following limitations:
  the use of an inner liner for the column necessary to set up shear and to create contact with reagents significantly increases the area exposed to the precipitate, which can nevertheless cause adhesion of the precipitate to the exposed surface if the lining surface is not systematically coated with highly hydrophobic materials;
  the use of a pulsed counter-current system creates dead zones in the column, on which drops can bond to the lining of the column, thus creating a precipitate deposit.

Therefore there is a need for a method of precipitating one or more solutes without the following disadvantages:
  bonding of the precipitate formed at the reactor walls, eventually generating clogging of the reactor;
  the obligation to coat the reactor walls with a hydrophobic coating to limit the bond of the precipitate on the walls;
  appearance of dead zones in the precipitation reactor leading to clogging of the reactor in these zones.

PRESENTATION OF THE INVENTION

The invention deals with a method for precipitating at least one solute in a reactor comprising:
  a) a step in which a first liquid phase comprising the solute and a second liquid phase comprising a solute precipitation reagent are brought into contact in co-current in a reactor, as a result of which a mix is obtained comprising precipitate particles in suspension, and a third liquid phase forming a dispersing phase for said mix; and
  b) a step in which the mix mentioned in step a) is fluidised by the third phase.

The method according to the invention has the following advantages due to the inherent nature of these two steps:
  the lack of bond of the precipitate to the reactor walls due to confinement of the mix comprising particles of precipitate by a third liquid phase, and fluidisation of the mix by this same third liquid phase that prevents any stagnation of these particles at the walls and enables drops that enclose said particles to bounce off the surface of the walls;
  the possibility of optimising adjustment of the residence time of the mix in the reactor due to the flexibility of the fluidisation condition (particularly by varying the flow of the third liquid phase to obtain optimum precipitation of the solute), this residence time being chosen so as to obtain large sized precipitate grains such that they will not bond to the reactor walls;
  good usage flexibility with the possibility of adapting the method as a function of the solute(s) that is (are) to be precipitated by the appropriate choice of a second liquid phase and a third liquid phase, provided that they match the criteria according to the invention.

As mentioned above, the method according to the invention includes a first step a) consisting of bringing a first liquid phase comprising the solute into contact with a second liquid phase comprising a solute precipitation reagent in co-current in a reactor, as a result of which a mix is obtained comprising precipitate particles in suspension, and a third liquid phase forming a dispersing phase for said mix.

Advantageously, the first liquid phase and the second liquid phase are miscible with each other, while the third liquid phase is immiscible with the mix comprising the first liquid phase and the second liquid phase.

Note that co-current means that the first liquid phase, the second liquid phase and the third liquid phase circulate in the same direction, which implies that they are injected into the reactor in a mode that enables this co-current circulation.

Thus, from a practical point of view, particularly in the case in which the density of the mix of the first liquid phase and of the second liquid phase is greater than the density of the third liquid phase, the first liquid phase, the second liquid phase and the third liquid phase may be injected into a reactor, for example, in a lower part of the reactor, this lower part forming an injection zone. For example, the inlet of the first liquid phase and the inlet of the second liquid phase may be arranged at the same height in the injection zone and facing each other, such that these two phases come into contact immediately when they are injected simultaneously, thus spontaneously forming a mix comprising a suspension of precipitate particles. According to this configuration, the inlet of the third liquid phase may be in the injection zone below the inlets of the first liquid phase and the second liquid phase.

If the density of the mix of the first liquid phase and of the second liquid phase is less than the density of the third liquid phase, the first liquid phase, the second liquid phase and the third liquid phase may be injected into a reactor, for example, in an upper part of the reactor, this upper part forming an injection zone. For example, the inlet of the first liquid phase and the inlet of the second liquid phase may be arranged at the same height in the injection zone and facing each other, such that these two phases come into contact immediately when they are injected simultaneously, thus spontaneously forming a mix comprising a suspension of precipitate particles. According to this configuration, the inlet of the third liquid phase may be in the injection zone above the inlets of the first liquid phase and the second liquid phase.

The first liquid phase, the second liquid phase and the third liquid phase may be injected continuously or semi-continuously, in which a semi-continuous injection means that at least one of the above mentioned liquid phases is injected continuously and at least one of the above mentioned liquid phases is injected discontinuously (for example by periodic start-stop, ramp or Dirac type injection).

Note that a dispersing phase means that the third liquid phase is such that the mix formed by bringing the first liquid phase into contact with the second liquid phase in which the precipitate is formed, is dispersed in the form of drops inside the third liquid phase, this third liquid phase usually being chosen so that it is immiscible with the mix resulting from the first liquid phase and the second liquid phase.

The step to create contact a) is conventionally done by injection of a first liquid phase, a second liquid phase and a third liquid phase in a specific zone of the reactor, for example a lower part of said reactor (called the injection zone) or an upper part of said reactor, knowing that the supply flow of the third liquid phase should preferably be greater than the supply flow of the first liquid phase and/or the second liquid phase, so that the third liquid phase can fluidise the mix resulting from the first liquid phase and the second liquid phase.

Furthermore, the choice of such a supply flow for the third liquid phase will also enable precipitate grains formed by reaction between the first liquid phase and the second liquid phase to not bond to the reactor walls.

As mentioned above, the first liquid phase and the second liquid phase will react with each other during use of step a) to form a mix comprising a precipitate of the solute, this mix will then be entrained by the third liquid phase in the fluidised bed condition (corresponding to step b) mentioned above and also called fluidisation).

Note that fluidisation means putting drops containing the formed precipitate particles into suspension into an upwards fluid flow, said drops containing particles forming the fluidised bed and the upwards fluid flow being composed of the third liquid phase.

The use of a fluidised bed condition is the result particularly of an increase in the size of these particles which can also prevent these particles from bonding to the walls, in addition to the fact that this bond is also prevented by confinement generated by the third liquid phase.

Apart from steps a) and b), the method may include a sedimentation step of the mix originating from step b), this sedimentation step possibly being done by simple settlement, this sedimentation step possibly being followed by a step to collect said precipitate.

The collection step may typically be done by drawing off precipitate particles that have sedimented. This collection may be followed by solid-liquid separation operations such as filtration, centrifuging or other types of operations, so as to remove any liquid phase drawn off with the precipitated particles from the precipitated particles, and washing and/or drying operations.

The method according to the invention may also include a recycling step of the third liquid phase, that can be re-injected in the injection zone mentioned above.

The method according to the invention is advantageously used particularly in the case in which the density of the mix of the first liquid phase and the second liquid phase is more than the density of the third liquid phase, in a fluidised bed reactor with a vertical principal axis comprising:
 a lower part (also called the bottom part), used for injection of the first liquid phase, the second liquid phase and the third liquid phase;
 an intermediate part (also called the middle part) used for fluidisation of the mix resulting from the first liquid phase and the second liquid phase by the third liquid phase; and
 an upper part (also called the top part) used for sedimentation of the precipitate formed.

Conversely, in the case in which the density of the mix of the first liquid phase and the second liquid phase is less than the density of the third liquid phase, the method may also advantageously be used in a fluidised bed reactor with a vertical principal axis comprising:
 an upper part (also called the top part) used for injection of the first liquid phase, the second liquid phase and the third liquid phase;
 an intermediate part (also called the middle part) used for fluidisation of the mix resulting from the first liquid phase and the second liquid phase by the third liquid phase; and
 a lower part (also called the bottom part) used for sedimentation of the precipitate formed.

When the method according to the invention is dedicated to oxalic precipitation of the actinides, particularly for the treatment of spent fuels, the precipitate formed in the framework of this method is a precipitate of actinide oxalate(s).

In this case:
- the first liquid phase is conventionally an aqueous solution comprising a solute including at least one actinide element (this solution being referred to as "actinide solution" in the following;
- the second liquid phase is conventionally an aqueous solution containing a precipitation reagent of the actinide element(s) present in the first liquid phase, this precipitation reagent being oxalic acid (this solution being referred to as an "oxalic solution" in the following; and
- the third liquid phase is conventionally an organic solution comprising an organic solvent immiscible with the first liquid phase and the second liquid phase, this organic solvent possibly being dodecane or hydrogenated tetrapropylene (known under the abbreviation HTP).

The actinide solution conventionally contains the actinide(s) in the form of nitrate(s), since this is the form in which these elements are usually produced by spent nuclear fuel treatment plants.

In particular, when the method according to the invention is used for the treatment of spent fuels, the actinides concerned may be uranium, plutonium, neptunium, thorium, americium and/or curium.

In particular, they may be uranium, plutonium, neptunium, americium and/or curium, when the oxalate precipitates formed are intended to be transformed into a compound of actinide(s) that can be used for the fabrication of oxide, carbide or nitride type nuclear fuel pellets.

The invention will now be described with regard to a particular embodiment described below, this embodiment being given for illustrative and non-limitative purposes.

DETAILED PRESENTATION OF PARTICULAR EMBODIMENTS

Example

Precipitation of Cerium Oxalate

Figure 1:
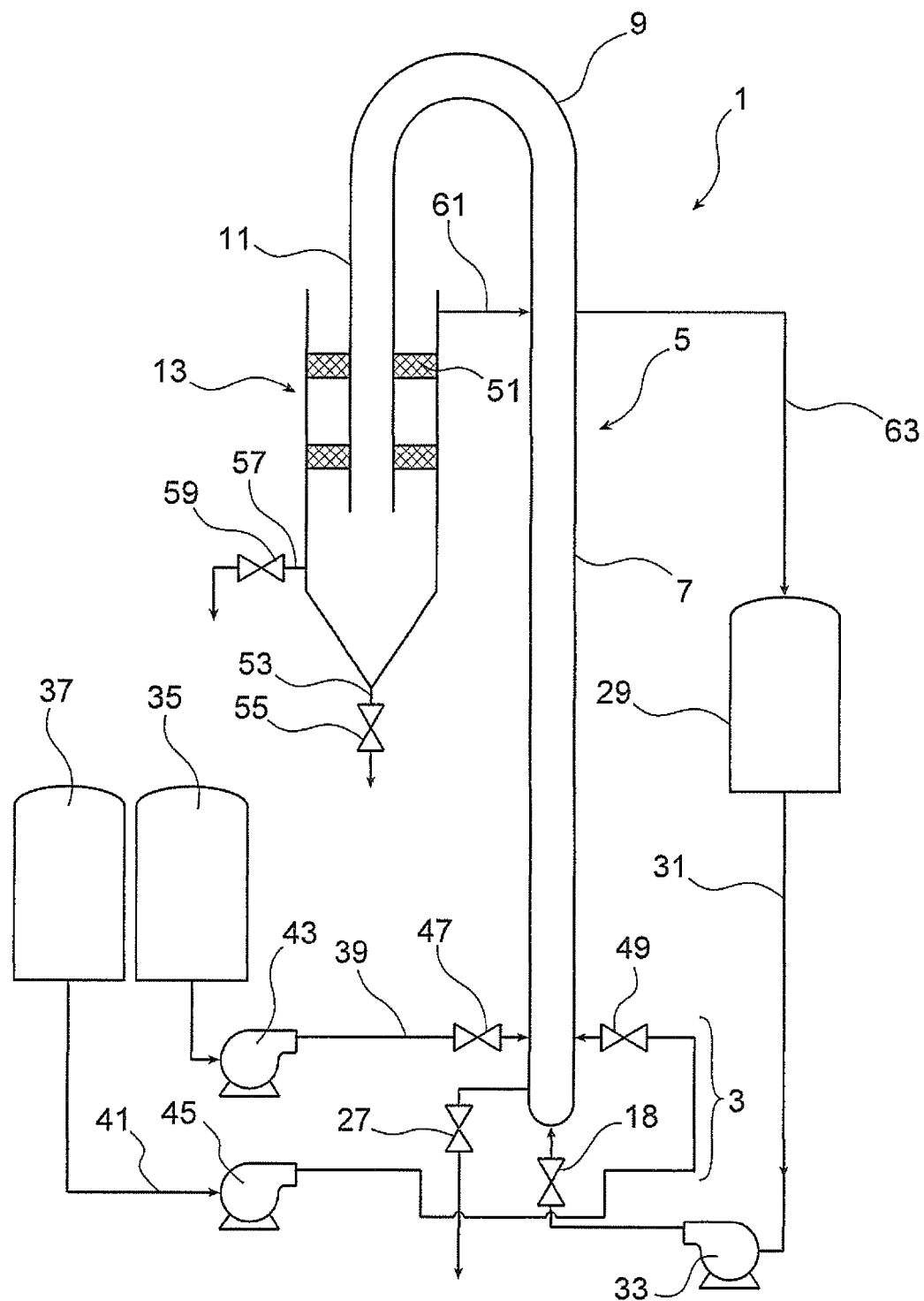
FIG. 1 is a diagram showing an appropriate reactor for the preparation of a precipitate of cerium oxalate in accordance with the method according to the invention.

Reactor 1 shown diagrammatically in FIG. 1 is used for tests related to precipitation of cerium oxalate.

Figure 2:
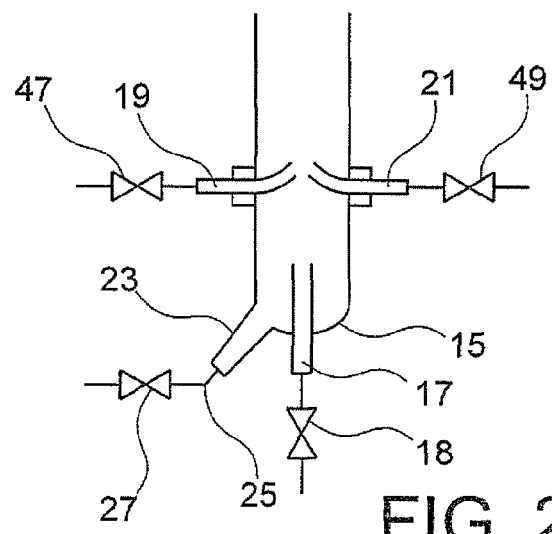
FIG. 2 is a diagram showing details of the lower part of the reactor (forming the injection zone) shown in FIG. 1.

This glass reactor with a vertical principal axis is composed of three parts:
- a lower part 3 forming the injection zone of the first liquid phase consisting of an aqueous solution comprising cerium in the form of cerium nitrate, the second liquid phase consisting of an oxalic solution and the third liquid phase consisting of an organic solution of hydrogenated tetrapropylene, this lower part being shown in detail in FIG. 2;
- an intermediate part 5 used to fluidise the emulsion mix formed from the first liquid phase and the second liquid phase by the third liquid phase, this intermediate part consisting of a cylindrical tube comprising a first vertical part 7 with a constant cross-section (15 mm diameter), with a curved part 9 and a second vertical part 11;
- an upper part 13 that will be used to recuperate the formed precipitate by sedimentation, consisting of a settlement tank into which the open end of the second vertical part 11 of the tube forming the intermediate part of the reactor is immersed.

More precisely, the lower part shown in detail in FIG. 2 is composed of a cylindrical tube with a constant cross-section (15 mm diameter) closed at its lower end 15.

The reagents, in other words the organic solution of hydrogenated tetrapropylene (forming the third liquid phase), the solution comprising cerium (forming the first liquid phase) and the oxalic solution (forming the second liquid phase) are introduced into this lower part via:
- a vertical nozzle 17 passing through the lower end of the tube and supplying the lower part of the reactor with an organic solution via a valve 18;
- two nozzles 19 and 21 located at mid-height of the injection zone and diametrically opposite each other, these nozzles 19 and 21 being composed of a horizontal glass tube starting from its inlet and finishing in the form of an elbow at the outlet (corresponding to the part of the nozzle that penetrates into the lower part of the reactor), these nozzles supplying the lower part of the reactor with oxalic solution and with a solution comprising cerium respectively.

The lower part 3 of the reactor is also provided with a tube 23 at its lower end used to drain the reactor, this tube being connected to a conduit 25 fitted with a valve 27.

The vertical nozzle 17 is connected to an organic solution supply tank 29 via a conduit 31 on which a pump 33 is mounted that can adjust the supply flow of the organic solution.

The nozzles 19 and 21 are connected to an oxalic solution supply tank 35 and a tank supplying a solution containing cerium 37 via conduits 39 and 41 on which pumps 43 and 45 and valves 47 and 49 are also mounted, to adjust the supply flow of the oxalic solution and the solution containing cerium.

The oxalic solution and the solution containing cerium are brought into contact in this lower part of the reactor, causing in situ generation of a precipitate of cerium oxalate within a mix of aqueous phases derived from the first and second liquid phases, this mix then being entrained towards the intermediate part of the reactor via the organic solution, which confines this mix within droplets dispersed in the organic solution.

As can be seen in FIGS. 1 and 2, the reactor does not contain a stirrer, the different phases being mixed solely by the supply flows of these different phases into this reactor.

As mentioned above, the intermediate part consists of a vertical cylindrical tube with a constant cross-section (15 mm diameter) that extends the tube forming the lower part of the reactor over a height of 1 m (thus forming a first vertical part) beyond which this tube is curved leading to a second vertical part, the end of which is immersed in the upper part of the reactor, the tube having the same section over its entire length.

Finally, the upper part 13 of the reactor consists of a settlement tank with a grating 51 that forces coalescence of fines (corresponding to very small droplets) that can be entrained by the organic solution during the settlement operation, an outlet 53 fitted with a valve 55 in its narrowed lower part to evacuate the precipitate and that can also form a drain line of the settlement tank and an outlet 57 fitted with a valve 59 for evacuation of oxalic mother water.

In the upper part, the settlement tank also comprises an overflow 61 through which the entire organic phase can be transferred to the organic phase tank 29 via a conduit 63.

Three tests (A, B and C respectively) were carried out under sticking precipitation conditions starting from a first liquid phase (a nitrate aqueous solution (1.5 N) of cerium nitrate with a concentration of 24 g/L), a second liquid phase (an oxalic aqueous solution with a concentration of 0.7 mol/L) and a third liquid phase (an organic solution of hydrogenated tetrapropylene HTP).

The first test A was done with the following liquid phase flows:
0.4 L/h of cerium nitrate (III);
0.4 L/h of oxalic acid; and
100 L/h of HTP.

Figure 3:
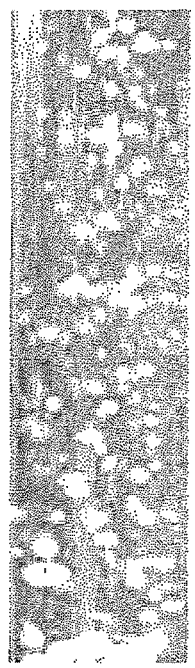
FIGS. 3 to 5 correspond to plates taken at the intermediate part of the reactor (first vertical part) for different operating modes presented in the following example.

The plate shown in FIG. 3 taken at the intermediate part of the reactor (more precisely the first vertical part before the curved part) shows a relatively mono-dispersed distribution of droplets (resulting from the mix of the first liquid phase and the second liquid phase), in which the precipitate can be distinguished during its formation.

The second test B is done by reducing the organic phase flow relative to test A, the corresponding flows of liquid phases being as follows:
0.4 L/h of cerium nitrate (III);
0.4 L/h of oxalic acid; and
80 L/h of HTP.

Figure 4:
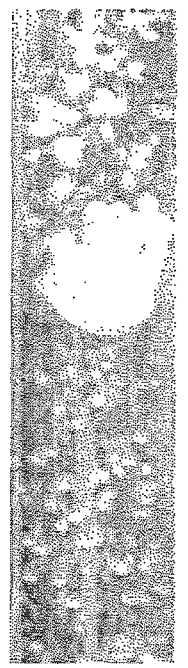

The plate shown in FIG. 4 taken at the same reactor level as FIG. 3 shows the appearance of macrodrops in which the precipitate can be distinguished as it deposits inside the macrodrops.

The third test C is done by further reducing the organic phase flow from the value in test B, the corresponding flows of the liquid phases being as follows:
0.4 L/h of cerium nitrate (III);
0.4 L/h of oxalic acid; and
60 L/h of HTP.

Figure 5:
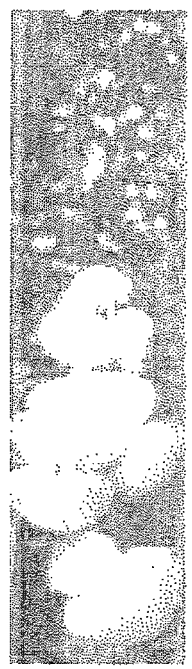

On the plate shown in FIG. 5, it can be seen that macrodrops are beginning to collect and to become organised to form clusters of drops containing precipitates. These clusters form cyclically and delimit separate zones at which precipitation occurs. These clusters conventionally have a lower displacement speed than the macrodrops obtained with the organic solution and are entrained upwards according to a pure piston type flow.

This mode is particularly interesting because it can give a stable confinement of precipitate clusters by the organic solution and a long residence time in the reactor.

This operating mode can also absorb relatively high supply flows in the first liquid phase (the phase containing cerium nitrate).

Thus, the following functional points have been observed for the appearance of precipitate clusters, for supply flows in the first liquid phase varying from 200 mL/h to 1000 mL/h:

| Supply flow in the first liquid phase (in mL/h) | Supply flow in the second liquid phase (in mL/h) | Supply flow in the third liquid phase (in L/h) |
|---|---|---|
| 200 | 200 | 50-55 |
| 400 | 400 | 55-60 |
| 800 | 800 | 70-75 |
| 1000 | 1000 | 80-85 |

The invention claimed is:

1. A method for precipitating at least one solute in a reactor comprising:
   a) contacting, in co-current circulation in a reactor,
      (i) a first liquid phase comprising the at least one solute and
      (ii) a second liquid phase comprising a solute precipitation reagent, forming a mix comprising precipitate particles of the at least one solute in suspension, and
      (iii) a third liquid phase forming a dispersing phase for said mix; and
   b) entraining said mix by the third liquid phase by fluidization, said fluidization comprising putting drops containing said precipitate particles into suspension in an upwards fluid flow, said drops containing said precipitate particles forming a fluidized bed and the upwards fluid flow being composed of the third liquid phase.

2. The method according to claim 1, in which the first liquid phase and the second liquid phase are miscible with each other, while the third liquid phase is immiscible with the mix formed from the first liquid phase and the second liquid phase.

3. The method according to claim 1, wherein the reactor comprises a height having an upper part and a lower part and the first liquid phase and the second liquid phase are injected into the reactor at the same height, while the third phase is injected into the reactor below the height of the first liquid phase and the second liquid phase, injection of the first liquid phase, the second liquid phase and the third liquid phase being done in the lower part of the reactor forming an injection zone.

4. The method according to claim 1, wherein the reactor comprises a height having an upper part and a lower part and the first liquid phase and the second liquid phase are injected into the reactor at the same height, while the third liquid phase is injected into the reactor above the height of the first liquid phase and the second liquid phase, injection of the first liquid phase, the second liquid phase and the third liquid phase being done in the upper part of the reactor forming an injection zone.

5. The method according to claim 1, wherein the third liquid phase is injected into the reactor at a supply flow greater than the supply flow of the first liquid phase and/or the second liquid phase.

6. The method according to claim 1, further comprising a sedimentation step of the mix originating from step b), after step b).

7. The method according to claim 6, further comprising collecting the precipitate particles, after the sedimentation step.

8. The method according to claim 1, further comprising a recycling step of the third liquid phase.

9. The method according to claim 3, wherein the method is conducted in a fluidised bed reactor with a vertical principal axis comprising:
   a lower part used for injection of the first liquid phase, the second liquid phase and the third liquid phase;
   an intermediate part used for fluidisation of the mix formed from the first liquid phase and the second liquid phase by the third liquid phase; and
   an upper part used for sedimentation of the precipitate particles.

10. The method according to claim 4, wherein the method is conducted in a fluidised bed reactor with a vertical principal axis comprising:
- an upper part used for injection of the first liquid phase, the second liquid phase and the third liquid phase;
- an intermediate part used for fluidisation of the mix formed from the first liquid phase and the second liquid phase by the third liquid phase; and
- a lower part used for sedimentation of the precipitate particles.

11. The method according to claim 1, wherein the solute is an actinide element.

12. The method according to claim 11, wherein the method is a method for oxalic precipitation of at least one actinide element.

13. The method according to claim 11, wherein:
- the first liquid phase is an aqueous solution, comprising at least one actinide element as solute;
- the second liquid phase is an aqueous solution containing a precipitation reagent of the actinide element(s) present in the first liquid phase, this precipitation reagent comprising oxalic acid; and
- the third liquid phase is an organic solution comprising an organic solvent immiscible with the first liquid phase and the second liquid phase.

14. The method according to claim 13, wherein the organic solvent is dodecane or hydrogenated tetrapropylene.

15. The method according to claim 1, wherein the first liquid phase and the second liquid phase are injected simultaneously into the reactor such that the first liquid phase and the second liquid phase come into contact immediately, forming the mix comprising precipitate particles of the at least one solute in suspension.

16. The method according to claim 1, wherein the first, second and third liquid phases are mixed by the supply flows of the first, second and third liquid phases into the reactor.

17. The method according to claim 16, wherein the reactor does not contain a stirrer.

18. The method according to claim 1, wherein the first, second and third liquid phases are injected continuously into the reactor.

19. The method according to claim 1, wherein the first, second and third liquid phases are injected semi-continuously into the reactor.

* * * * *